United States Patent [19]
Aden et al.

[11] Patent Number: 5,450,594
[45] Date of Patent: Sep. 12, 1995

[54] ENHANCED COLLISION DETECTION FOR ETHERNET NETWORK

[75] Inventors: Charles M. Aden; Martin H. Graham, both of Berkeley, Calif.

[73] Assignee: Tut Systems, Inc., Pleasant Hill, Calif.

[21] Appl. No.: 172,489

[22] Filed: Dec. 22, 1993

[51] Int. Cl.[6] ............................................. H04Q 1/20
[52] U.S. Cl. ........................ 395/200.06; 395/730; 340/825.5; 370/85.2
[58] Field of Search .................... 395/725, 200, 325; 340/825.5; 375/7, 10; 370/85.2

[56] References Cited
U.S. PATENT DOCUMENTS

| | | | |
|---|---|---|---|
| 4,719,458 | 1/1988 | Miesterfeld et al. | 340/825.5 |
| 4,739,323 | 4/1988 | Miesterfeld et al. | 340/825.5 |
| 4,779,088 | 10/1988 | Restrepo | 340/825.5 |
| 4,984,248 | 1/1991 | Hong | 375/7 |
| 5,164,960 | 11/1992 | Wincn et al. | 375/10 |
| 5,191,300 | 3/1993 | Graham et al. | |
| 5,379,005 | 1/1995 | Aden et al. | |

*Primary Examiner*—Jack B. Harvey
*Assistant Examiner*—Glenn A. Auve
*Attorney, Agent, or Firm*—Blakely, Sokoloff, Taylor & Zafman

[57] ABSTRACT

Enhanced collision detection in an Ethernet network, particularly useful for passive nodes using receive mode collision detection. When a transmitting node detects a collision, for example, using transmit mode collision detection, it activates a current sink at the node further reducing the DC potential on the line. This reduced DC potential assists in overcoming the low frequency impedance which may exist between the transmitting node and a remotely located passive node.

7 Claims, 3 Drawing Sheets

ENHANCED COLLISION DETECTION FOR ETHERNET NETWORK

FIELD OF THE INVENTION

1. The invention relates to the field of collision detection in Ethernet networks.

2. Prior Art

In an Ethernet network, before a node transmits it first determines if a transmission is occurring from another node. Roughly speaking, if the node senses the network line to be at 0 volts, it assumes there is no traffic on the line and thus, it can transmit. On the other hand, if the DC voltage on the line is between approximately −0.2 volts and −1.4 volts, it is assumed that one other node is transmitting. This DC voltage is in effect the average of the transmitted signal from a node.

Collisions between transmitted signals occur in Ethernet networks in part because propagation delays and other delays, such as those associated with detecting the status of the line, prevent a node from precisely knowing when another node is transmitting. When a collision occurs, the DC potential on the line drops below −1.4 volts allowing all the nodes to know that a collision has occurred. This DC voltage is again, in effect, the average of the colliding signals. It is important for repeater nodes to know when a collision has occurred because, for example, a repeater must substitute a jamming code for the indeterminate AC signal that results from a collision. The sensing of the DC potential on the line by a passive (nontransmitting) node to determine when a collision has occurred is referred to as receive mode collision detection. One problem with receive mode collision detection is that the low frequency impedance of the line becomes important, for instance, resistance in the line can slow the propagation of or attenuate the DC control signals used to indicate the status of the line. Thus, long line lengths become more difficult to operate on. This limits the practical line length of a network.

In transmit mode collision detection, a transmitting node can sense that its transmitted signal has collided with another signal. The node, however, does not inform passive nodes of the collision and definition passive node may not be able to see the collision. This can lead to a loss of control in the Ethernet network.

As will be seen, the present invention enhances collision detection particularly by those nodes relying on receive mode collision detection.

SUMMARY OF THE INVENTION

Improved collision detection in an Ethernet network is described. Each of the media access units include circuitry for detecting collisions. When a unit detects that its transmission has collided, it engages a controllable current sink connected to the line causing the line to be pulled more negative. This in turn enables nontransmitting media access units, particularly those relying upon receive mode collision detection, to more readily sense that a collision has occurred. Consequently, with the present invention, longer lines can be used.

In the currently preferred embodiment, the invention is implemented using the collision detection circuitry found in a commercially available integrated circuit. The detection of a collision is logically ANDed with a transmit signal to provide a control signal for the current sink.

DETAILED DESCRIPTION OF THE INVENTION

An enhanced collision detection method and apparatus is described which helps overcome problems associated with low frequency impedance in an Ethernet line. In the following description, numerous specific details are set forth such as specific part numbers, etc., in order to provide a thorough understanding of the present invention. In other instances, well-known Ethernet parameters are not set forth in detail in order not to unnecessarily obscure the present invention in detail.

Figure 1:
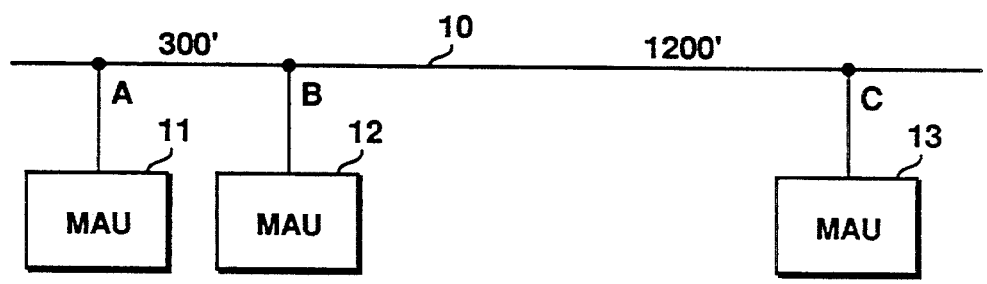
FIG. 1 shows a portion of an Ethernet network with three nodes. This figure is used to describe the operation of the present invention.

Referring first to FIG. 1, a portion of an Ethernet network is shown comprising a line 10 and three nodes identified as nodes A, B and C. Each node includes a media access unit (MAU). Specifically, nodes A, B and C are shown with MAUs 11, 12 and 13, respectively. The line 10 may be a twisted pair, flat parallel wire telephone cable sometimes referred to as "silver-satin", coaxial cable or the like. Each of the nodes are shown having just an MAU, typically however, the nodes will also include an attachment unit interface (AUI) and data terminal equipment (DTE). Later in this application the improvement provided by the present invention will be described in conjunction with the nodes of FIG. 1 and the waveforms shown in FIG. 4.

It will be helpful to briefly review the problem solved by the present invention which may be understood from FIG. 1. If nodes A and B are communicating and a collision occurs, these nodes are readily able to detect the collision since they are relatively close together. On the other hand, assume that node C is a relatively large distance from nodes A and B, as illustrated in FIG. 1. The negative control signal (less than −1.4 volts) created by the collision of signals from nodes A and B may not be detectable by node C since the impedance of the line may be great enough to prevent the propagation of this voltage to node C. If node C is unaware of the collision occurring between the transmissions of nodes A and B, and is a device requiring receive mode collision defection, then it will misfunction.

Figure 2:
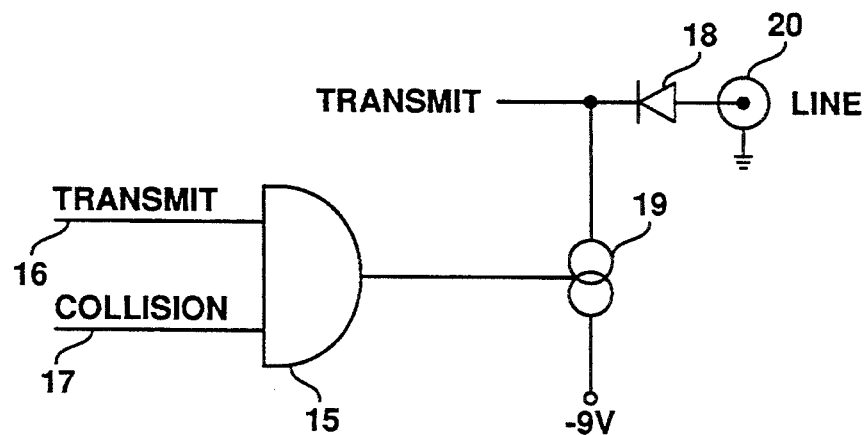
FIG. 2 illustrates the logical ANDing which occurs in the currently preferred embodiment of the present invention.

The improvement of the present invention is succinctly shown in FIG. 2. There the Ethernet line is shown as a coaxial cable 20, this corresponds to line 10 of FIG. 1. A single node is shown coupled to the line 20 and, in particular, the transmit line is shown connected from the node through diode 18 to the line 20. With the improvement of the present invention, when a node detects a collision it provides a signal on line 17 to the AND gate 15. If the node is also transmitting when the collision is detected, an additional signal is provided on line 16 to the AND gate 15. If both inputs to the AND gate 15 are present, an output from the AND gate 15 activates a current sink 19. In the currently preferred embodiment, a current of approximately 18 milliamps is sinked from the line. This causes the line 20 to drop in potential, enhancing the chances of a distant node detecting the collision.

Figure 3:
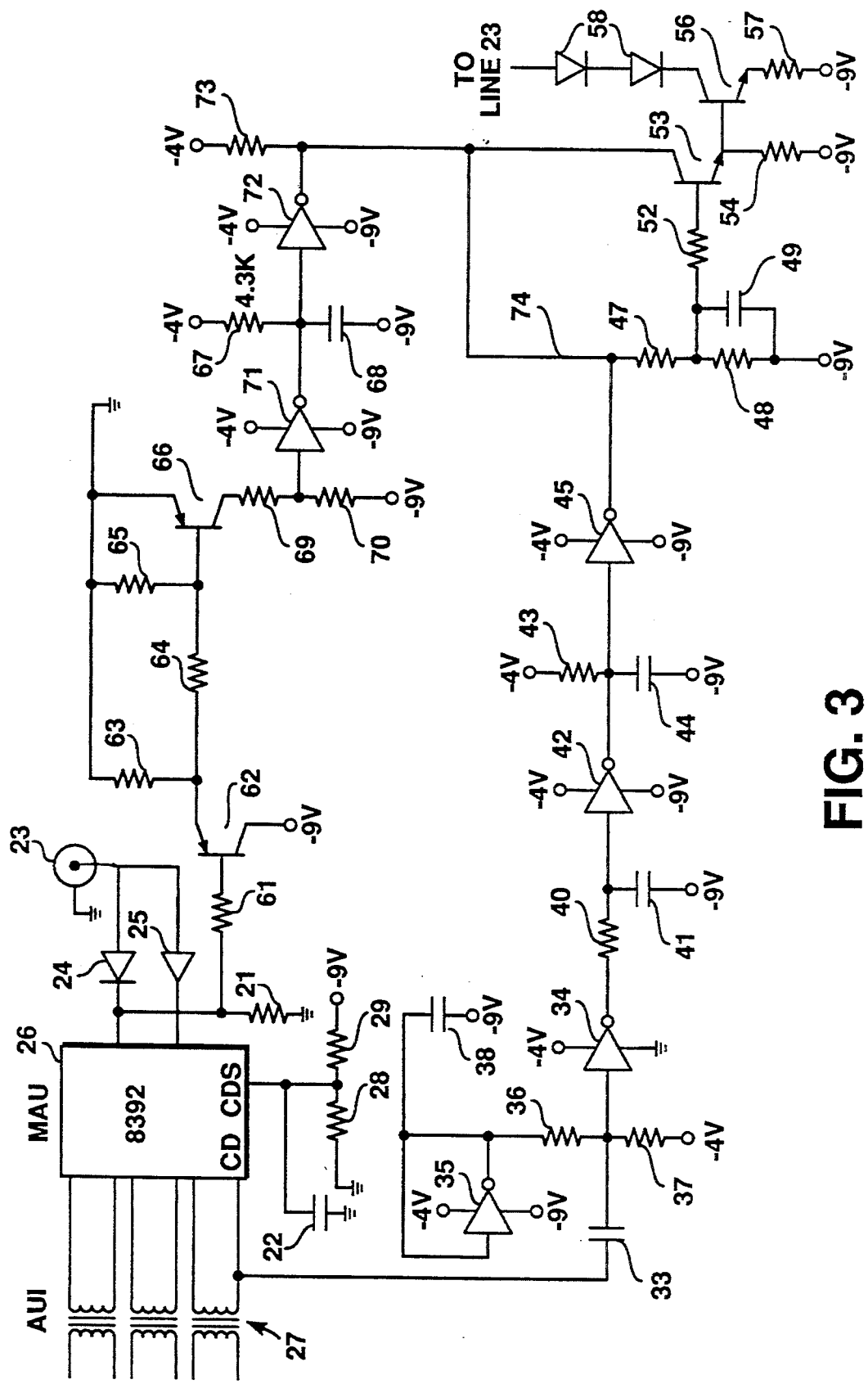
FIG. 3 is an electrical schematic of the currently preferred embodiment of the present invention.

The currently preferred embodiment of the present invention is illustrated in FIG. 3. A single node is shown coupled to an Ethernet line 23 which line corresponds to line 10 of FIG. 1. A commercially available integrated circuit 26, part number 8392, is used as part of the MAU in the currently preferred embodiment.

The circuit 26 includes a collision detector. When a collision is detected, circuit 26 typically provides a signal through the AUI 27 to a DTE. This enables the DTE to retransmit the signal in accordance with well-known protocols. The transmit terminal from circuit 26 is coupled to line 23 through a diode 24. The receive terminal of the circuit 26 is coupled to the line 23 through an optionally used equalizing amplifier 25. Where a flat cable is used as the Ethernet line, the preferred coupling to the line is described in co-pending application Ser. No. 092,721; filed Jul. 16, 1993, entitled "Flat Cable to Flat Parallel Wire Cable", assigned to the Assignee of the present application now U.S. Pat. No. 5,379,005. The optional equalizing amplifier 25 may be constructed as shown in U.S. Pat. No. 5,191,300.

Remaining circuitry shown in FIG. 3 in the currently preferred embodiment, is associated with the MAU and provides the improvement of the present invention.

The circuit of the present invention detects when the circuit 26 has determined that a collision has occurred on the line 23. A "CD" terminal of circuit 26 is coupled through the capacitor 33 to a detector comprising inverter 35, resistors 36 and 37 and the inverter 34. The digital inverter 34 operates as a comparator, its input is biased through the resistors 36 and 37 the reference potential provided by the inverter 35. Consequently, a signal is provided by the inverter 34 indicating that the circuit 26 has detected a collision on the line 23. The output of the inverter 34 is coupled through resistor 40 to the input of an inverter 42.

The input of inverter 42 is also coupled to the −9 volt supply through a capacitor 41. The resistor 40 and capacitor 41 operate as a noise filter to filter out unwanted noise from the detector.

The inverter 42 has an open collector output and together with a resistor 43 and a capacitor 44 functions as a memory circuit. One terminal of the resistor 43 is coupled to the −4 volt supply and one terminal of the capacitor 44 is coupled to the −9 volt supply. A signal present at the output of open collector inverter 45 represents the occurrence of a collision.

The CDS terminal of the circuit 26 is coupled to the common junction between resistors 28 and 29 and to ground through capacitor 22. These resistors are coupled between the −9 volt supply and ground. They provide a threshold level for the transmit mode collision detection of circuit 26.

The circuitry of FIG. 3 also uses a signal indicating that transmission is occurring. (This corresponds to the signal on line 16 of FIG. 2.) As currently implemented, transmissions are sensed on the output transmit terminal of the circuit 26. An indication of transmission may be obtained from other points in the node, for instance, from the input transmit terminals of the circuit 26. The transmit terminal of circuit 26 is coupled to the base terminal of a transistor 62 through a resistor 61 and to ground through a resistor 21. The collector terminal of transistor 62 is coupled to the −9 volt supply. The emitter terminal of this pnp transistor is coupled to ground through resistor 63. Additionally, the emitter terminal of transistor 62 is coupled to the base terminal of a transistor 66 through a resistor 64. Resistor 65 couples the base terminal of the transistor 66 to ground. The collector terminal of the pnp transistor 66 is coupled to the −9 volt supply through the resistors 69 and 70. The common terminal through these resistors is coupled to the input of an inverter 71.

The transistor 62 operating as an emitter follower receives the transmitted signal from the circuit 26. Transistor 62 drives the transistor 66 which operates as a switch. Consequently, the output of transistor 66 which is coupled to the input of the inverter 71, is a digital signal indicating when the circuit 26 is transmitting. The output of inverter 71 is coupled to the −4 volt supply through resistor 67 and to the −9 volt supply through resistor 68.

The ANDing function illustrated in FIG. 2 is performed by the circuit of FIG. 3 through the inverters 45 and 72. The outputs of these inverters are coupled together by line 74. Line 74 is coupled to the −4 volt supply through a resistor 73 and to the −9 volt supply through resistors 47 and 48. Inverters 45 and 72 operate as open-collector buffers and, consequently, provide wired logic represented by the AND gate 15 of FIG. 2. This signal on line 74 represents the condition that circuit 26 is transmitting and that circuit 26 has detected a collision on line 23.

The common terminal between resistors 47 and 48 is coupled to the −9 volt supply through a capacitor 47. Resistors 47, 48 and capacitor 49 provide a low pass filter used to attenuate the high frequencies associated with the switching on line 74. The output of the filter is coupled through a resistor 52 to the base terminal of a transistor 53. The emitter terminal of this transistor is coupled to the −9 volt supply through a resistor 54; the collector terminal of this transistor is coupled to the −4 volt supply through resistor 73. The output of transistor 53 is coupled to the base terminal of a transistor 56. The emitter terminal of transistor 56 is coupled to the −9 volt supply through a resistor 57 and the collector terminal of this transistor is coupled to the line 23 through a diodes 58.

The signal from line 74 after being filtered provides a control signal that controls the transistors 53 and 56. Transistor 56 provides a driving current in the form of a current sink to draw off current from the line 23 when the conditions described (the detection of both collision and transmission) are met. As mentioned in the currently preferred embodiment, a current sink of approximately 18 milliamps is provided.

Note the ANDing function discussed above prevents passive nodes with the improvement of the present invention from sinking current from the line when a collision is detected.

In the currently preferred embodiment, inverters 34 and 35 are commercial inverters, part number 74HC04P. The inverters 42, 45, 71 and 72 are part number 74HC05P. The value of the resistors and capacitors used in the currently preferred embodiment are shown in the table below.

| Resistors | OHMs | Capacitors | Farads |
| --- | --- | --- | --- |
| 21 | 10K | 38 | .1MF |
| 28 | 750K | 33 | 47pF |
| 29 | 12K | 41 | 22pF |

-continued

| Resistors | OHMs  | Capacitors | Farads |
|-----------|-------|------------|--------|
| 36        | 8.2K  | 44         | 100pF  |
| 37        | 100K  | 49         | 12pF   |
| 40        | 470K  |            |        |
| 43        | 2K    | 68         | 100pF  |
| 47        | 7.5K  |            |        |
| 48        | 16.9K |            |        |
| 52        | 100K  |            |        |
| 54        | 10K   |            |        |
| 57        | 49.9K |            |        |
| 61        | 15K   |            |        |
| 63        | 5K    |            |        |
| 64        | 3.9K  |            |        |
| 65        | 10K   |            |        |
| 67        | 4.3K  |            |        |
| 69        | 6.8K  |            |        |
| 70        | 5K    |            |        |
| 73        | 7.5K  |            |        |

Figure 4:
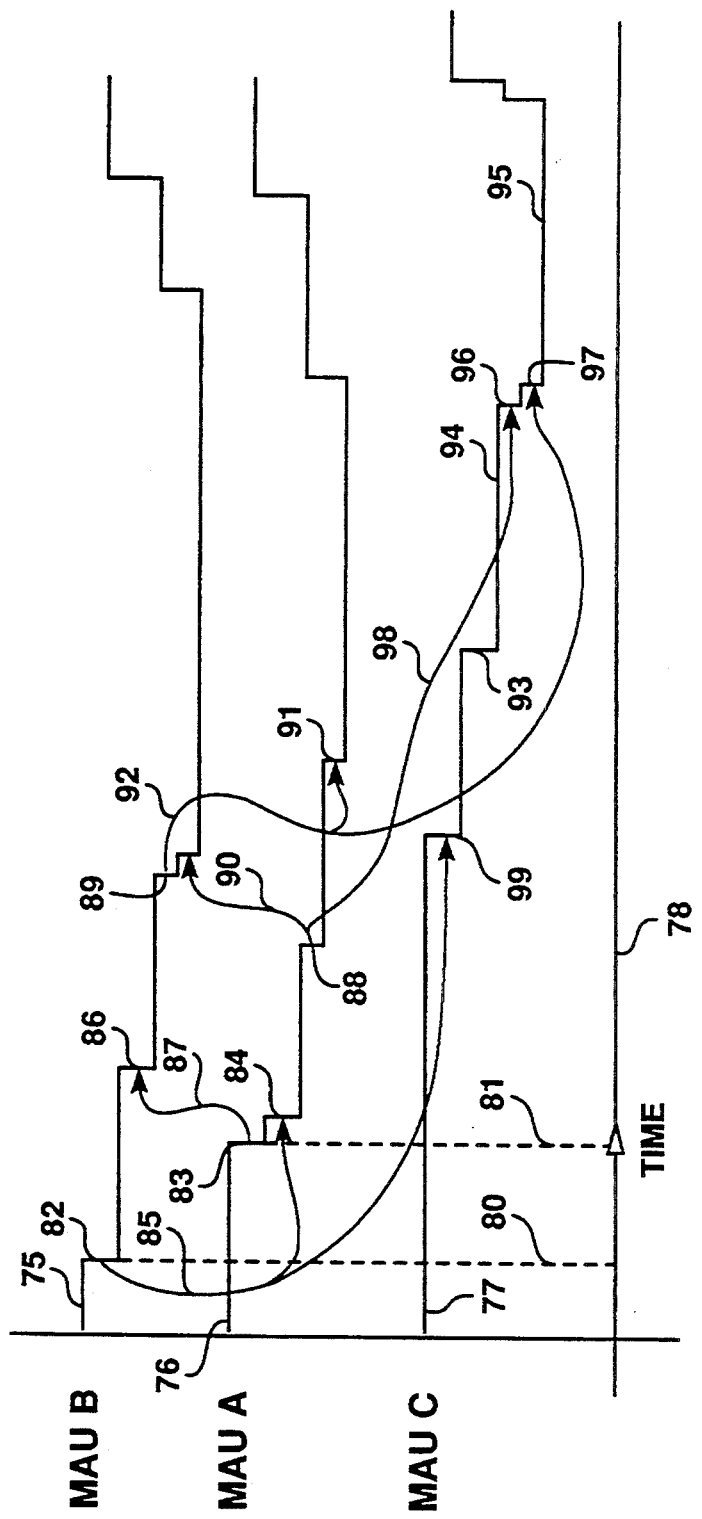
FIG. 4 illustrates the waveforms of signals on the network line of FIG. 1 for the three nodes shown in FIG. 1. These waveforms illustrate the improvement of the present invention.

Referring now to FIG. 4, three waveforms are shown along a time axis 78. The first waveform 75 represents the low frequency or DC potential sensed at the node B of FIG. 1. The second waveform 75 represents the low frequency or DC potential sensed at the node A of FIG. 1; and, finally, the waveform 77 represents the low frequency or DC potential at node C.

Assume first that node B begins transmitting at time 80. As can be seen in FIG. 4, there is a drop in the DC potential represented by segment 82 of waveform 75. Next assume that node A begins transmitting at time 81; the DC potential at node B drops as shown by segment 83 of waveform 76. Note that at the time node A begins transmitting, it does not know that node B is already transmitting because of the propagation delay between nodes A and B.

After node A begins transmitting, the potential at node A drops because of the collision occurring between the transmissions of nodes A and B. The segment 84 of waveform 76 illustrates this and the arrow 85 indicates the cause and effect between the segments 82 and 84. Next, node B senses the transmission from node A as indicated by the segment 86 of waveform 75 and the arrow 87.

Node A is the first to sense the collision and assuming it has the enhancement of the present invention, the conditions for its current sink to operate are met and it further reduces the potential on the line as indicated by the segment 88 of waveform 76. Following this, node B which is also assumed to have the enhancement of the present invention, has its current sink operate and reduces the potential on the line as indicated by segment 89 of waveform 75. The reduction at node A reaches node B and is sensed at node B as indicated by an arrow 90. Similarly, the reduction at node B is sensed at node A as indicated by segment 91 of waveform 76 and arrow 92.

Now examining the potentials at node C represented by the waveform 77, first node C receives and senses the drop in potential caused by node B's initial transmission. This is represented by the segment 99 of waveform 77 and an arrow 85. Next node C senses the fact that node A has begun transmitting as represented by the segment 93 of waveform 77. At this point in time, node C senses the potential represented by level 94 of waveform 77. This level, because of attenuation over the relatively long line separating node C from nodes A and B, may not be low enough for node C to conclude that a collision has occurred. However, because of the improvement of the present invention, the level at node C is dropped even further to level 95 in two separate drops represented by segments 96 and 97. Segment 96 of waveform 77 is caused by the activation of the current sink at node A as represented by an arrow 98 and similarly, the segment 97 is the result of the activation of the current sink at node B as represented by an arrow 92.

Thus, with the present invention, the passive node C receives a signal represented by level 95 rather than 94 and is better able to detect a collision.

The remaining portions of the waveform 75, 76 and 77 illustrate that first node A ceases to transmit, then node B ceases to transmit and the line returns to its initial quiescent potential at these nodes and eventually, this quiescent state propagates to node C.

Thus, an improvement has been described which permits passive nodes on an Ethernet network to more readily detect a collision that has occurred between active nodes.

I claim:

1. In an Ethernet network having a line interconnecting a plurality of media access units (MAUs), an improvement comprising:
    a first circuit at a first one of the MAU for detecting a collision on the line of a data signal transmitted by the first MAU with other data being transmitted on the line; and,
    a second circuit coupled to the first circuit and the line for driving a current from the line in response to the first circuit detecting a collision, the current informing other MAUs on the line of a collision on the line.

2. In a media access unit for accessing an Ethernet line, the unit having a first circuit which provides a first signal indicating a collision of data on the line, an improvement in the unit comprising:
    a second circuit for logically ANDing the first signal indicating the collision with a second signal generated by the unit when the unit is transmitting data on to the line to provide a control signal; and,
    a current sink for sinking a current from the line under control of the control signal from the second circuit.

3. A media access unit for use in an Ethernet network having a line on which data is communicated, the unit comprising:
    a receive and transmit mode collision detector coupled to the line for detecting a collision on the line: and
    a circuit coupled to the collision detector and coupled to the line for applying a first potential to the line in response to detecting a collision, the first potential being different from a second potential used for transmitting the data on the line, the first potential for signaling to the network that the collision has occurred.

4. The unit defined by claim 3 wherein the circuit only applies the first potential to the line when the collision detected is caused by data transmitted by the unit.

5. A method for providing improved collision detection in an Ethernet network comprising the steps of:
    determining when a collision occurs with a transmission from a node on the network; and
    sinking a current from the network by the node when the collision is detected in response to the collision to inform other nodes in the network that the collision has occurred, the current being different than that used to transmit data on the network.

6. An Ethernet network comprising:

a line;

a first node coupled to the line having a first collision detector and the first node also having a current sink circuit for sinking current from the line when a collision with a transmission from the first node is detected by the first collision detector;

a second node having a second collision detector; and where, the current sinked by the current sink circuit of the first node is detectable by the second collision detector of the second node.

7. A circuit for coupling to a media access unit for an Ethernet network, the circuit comprising:

a first detector coupled to the unit for detecting when the unit has sensed a collision;

a second detector coupled to the unit for detecting when the unit is transmitting;

logic coupled to the first and second detectors for providing a control signal when the first detector has detected that the unit sensed a collision and the second detector has detected a transmission by the unit; and, a current sink coupled to operate under control of the control signal for sinking current from the network to inform other units in the network of the collision.

* * * * *